United States Patent
Bergadano et al.

(10) Patent No.: US 6,574,627 B1
(45) Date of Patent: Jun. 3, 2003

(54) METHOD AND APPARATUS FOR THE VERIFICATION OF SERVER ACCESS LOGS AND STATISTICS

(76) Inventors: Francesco Bergadano, Via San Francesco d'Assisi 14, Torino (IT), 10122; Pancrazio De Mauro, Piazza Marconi 14, Pieve del Cairo (IT), 27037

(*) Notice: Subject to any disclaimer, the term of this patent is extended or adjusted under 35 U.S.C. 154(b) by 0 days.

(21) Appl. No.: 09/256,417

(22) Filed: Feb. 24, 1999

(51) Int. Cl.$^7$ ............................................ G06F 15/163
(52) U.S. Cl. .......................... 707/9; 707/10; 707/201; 707/202; 709/203; 709/219; 709/229; 713/156; 713/161; 713/168; 713/170; 713/176; 713/182
(58) Field of Search .............................. 707/10, 9, 202, 707/201; 709/203, 219, 229; 713/156, 161, 168, 170, 176, 182

(56) References Cited

U.S. PATENT DOCUMENTS

| | | | | |
|---|---|---|---|---|
| 5,708,780 A | * | 1/1998 | Levergood et al. | 709/229 |
| 5,732,218 A | * | 3/1998 | Bland et al. | 709/224 |
| 5,864,665 A | * | 1/1999 | Tran | 713/155 |
| 5,870,546 A | * | 2/1999 | Kirsch | 709/205 |
| 6,055,508 A | * | 4/2000 | Naor et al. | 705/11 |
| 6,092,196 A | * | 7/2000 | Reiche | 705/52 |
| 6,112,238 A | * | 8/2000 | Boyd et al. | 709/224 |
| 6,298,123 B1 | * | 10/2001 | Nolting et al. | 379/112 |
| 6,304,904 B1 | * | 10/2001 | Sathyanarayan et al. | 709/224 |
| 6,317,787 B1 | * | 11/2001 | Boyd et al. | 709/224 |

\* cited by examiner

*Primary Examiner*—Jean R. Homere

(57) ABSTRACT

A method and apparatus for verifying the correctness of server access logs. The server is required to transfer the relevant log information for each client request to, an authentication device. In a preferred embodiment, the device has to be tamper-evident and responds with a Message Authentication Code (MAC) and a binary digit B. The MAC is stored on an accessible medium by the server. If B=0, the request is processed normally. If B=1 (this happens with a small probability), the server is required to issue a "redirect" response to the client, instructing it to connect to a different server, controlled by a certification agency. The agency's server logs this request and redirects it back to the original server, where it is eventually serviced. The certification agency periodically verifies each MAC and checks whether requests where B=1 correspond to an associated client log entry on its server. If this does not happen in a high number of cases, certification of the log file could be denied, based on the agency's policy. A preferred embodiment of this invention is with the HTTP protocol, for the auditing of Web site popularity.

24 Claims, 5 Drawing Sheets

METHOD AND APPARATUS FOR THE VERIFICATION OF SERVER ACCESS LOGS AND STATISTICS

CROSS-REFERENCE TO RELATED APPLICATIONS

Not applicable (no prior applications for this invention)
References to related patents and publications:
U.S. Patent Documents
U.S. Pat. No. 5,732,218 March 1998 Bland, et al. 395/200.54
U.S. Pat. No. 5,812,776 September 1998 Gifford 395/200.47
U.S. Pat. No. 5,812,769 September 1998 Graber et al. 395/200.12
U.S. Pat. No. 5,751,956 May 1998 Kirsch 395/200.33
U.S. Pat. No. 5,708,780 January 1998 Levergood, et al. 395/200.59
Foreign Patent Documents
WO9826571 June 1998 WIPO H04M15/00
WO9827502 June 1998 WIPO G06F19/00
Other bibliographic references
Pitkow. In Search of Reliable Usage Data on the WWW. Proceedings of the International WWW Conference, 1997.
Naor and Pinkas. Secure Efficient Metering. Proceedings of Eurocrypt, 1998.
Franklin and Malkhi. Auditable Metering with Lightweight Security. Proceedings of the Financial Cryptography Workshop, 1997.
Krawczyk, Bellare and Canetti. HMAC: Keyed Hashing for Message Authentication, IETF-RFC 2104, 1997.
Berners-Lee, et al. Hypertext Transfer Protocol—HTTP/1.0, IETF-RFC 1945, 1996.
Berners-Lee, et al. Hypertext Transfer Protocol—HTTP/1.1, IETF-RFC 2068, 1997.
Anderson and Kuhn. Tamper Resistance—a Cautionary Note. Proceedings of the Usenix Workshop on Electronic Commerce, 1996.
M. K. Reiter, V. Anupam and A. Mayer. Detecting Hit-shaving in Click-through Payment Schemes. Third Usenix Workshop on Electronic Commerce, Boston, 1998.

STATEMENT REGARDING FED SPONSORED RESEARCH OR DEVELOPMENT

Not applicable

REFERENCE TO A MICROFICHE APPENDIX

Not applicable

FIELD OF THE INVENTION

This invention relates to client-server computer communication systems. Specifically, this invention considers systems in which relevant data about communications between a server and many clients is logged and certified. Still more particularly, a preferred embodiment of this invention relates to systems on the World Wide Web (WWW) where a third party agency audits and certifies access statistics of an HTTP server receiving requests from a plurality of HTTP clients.

BACKGROUND OF THE INVENTION

The Internet is currently the largest computer network, counting several millions of interconnected computers that exchange information using the widespread TCP/IP Protocol. The Internet's most popular information system is the World Wide Web (WWW, the Web). The Web is a client-server distributed hypermedia system, based on the HTTP protocol. On-line Web advertisement represents a significant portion of Internet-related revenues. However, no reliable and widespread system for metering Web site accesses has emerged. As a consequence, a few well-known sites, such as the main news sites and the most effective search engines dominate the market, because their popularity is taken as a given fact. For many sites of medium to high popularity, there is a great potential for increasing advertisement profits, but investors need third party evaluation of purported access rates and characteristics.

Since it is reasonable to expect that advertisement profits grow with the site's popularity, there are valid reasons for the Web site's institution to forge metering data. Forging the file that stores access data is not the only method to obtain false metering information. In the WWW setting, for example, there exists a technique called "IP spoofing" that allows an HTTP client, under specific circumstances, to masquerade as another client, with a different IP address. This method could be used to produce many fictitious requests addressed to an HTTP server, which in turn would record an increased number of hits. For a third party to guarantee the correctness of Web server access statistics, it is necessary to provide an apparatus that avoids metering data falsification by the Web site's institution. For obvious reasons of standardization, this goal should be reached without the need of modifying the client, and with as few modifications as possible on the server side.

Much work has been devoted to the problem of understanding, summarizing and correcting access logs. The paper by Pitkow, published in the Proc. of the Int. WWW Conference, 1997, provides a good survey, with special reference to the use of proxies. U.S. Pat. No. 5,732,218 is also related to the issue of gathering Web site statistics, using both server-side and client-side arrangements. A number of commercial products for analyzing Web server logs are available. Most of the above work, however, does not deal with the intentional falsification by the organization running the server. For this problem, which is the subject of the present invention, two recent studies are of interest.

The work by Naor and Pinkas, on "Secure Efficient Metering" (published in the Proc. of Eurocrypt 1998), is based on secret sharing among clients, and transmission of secret shares from client to server, so that that the server may prove its purported hit rate by reconstructing the original secret. This requires a special initialization of clients that is not practically feasible in a Web setting. The same problem may be observed in some embodiments of U.S. Pat. No. 5,732,218.

The work by Franklin and Malkhi on "Auditable Metering with Lightweight Security" (published in the Proc. of the Financial Cryptography Workshop, 1997), uses a timing scheme to raise the cost of false client requests, so that it becomes uninteresting to forge a high number of hits. This was also granted patent WIPO WO9826571 in 1998. The technique by Franklin and Malkhi requires normal clients to perform extra computations just for the purpose of auditing, and this may be unattractive for commercial servers.

The present invention allows third parties to verify hits in a secure way, without changing clients in any way, and with a very minor overhead. The invention requires that the protocol used by clients and servers support any form of redirection or referrals; in particular, it may be applied to the HTTP protocol, which allows for redirection. The redirection capabilities of HTTP were used in previous US patents. U.S. Pat. No. 5,812,776 uses HTTP redirection to allow users to identify a resource by means of a traditional locator, such as a telephone number—a first server will then map this locator to an IP address and redirect the client automatically to the actual resource available from a second server. Server-to-server interactions related to redirection have been used for access control in U.S. Pat. No. 5,708,780 and in WIPO patent WO9827502.

Redirection was used in U.S. Pat. Nos. 5,751,956 and 5,812,769 for tracking client requests, a goal that is related to the present invention as well as to WIPO patent WO9826571, discussed above. The same problem of tracking client request paths is studied in the work by Reiter et al., published in the proceedings of the Third Usenix Workshop on Electronic Commerce, 1998. These studies consider a situation where a user visits a first Web site, and then uses a hyperlink on said first Web site to connect to a second Web site. For example, said first Web site could be a search engine server, and the second Web site could be an electronic commerce facility advertised on said first Web site. Both sites are interested in keeping track of the user's action to monitor advertisement effectiveness and agree on corresponding fees. Redirection and specific security measures are suggested in the above studies to make user tracking possible and reliable. However, redirection is used heavily, and may slow client responsiveness in a significant way. Moreover, the above studies and patents do not solve the general problem of veriyfing the number and the characteristics of client connections received by a server.

The present invention provides a viable and general solution for auditing Web site popularity. The solution is very efficient, because it uses redirection with a small probability in order to cause external references of client accesses to an HTTP server. In a preferred embodiment, redirection can be limited to a very small percentage of client requests, because tamper-evident hardware is installed at the Web site location and occurrences of redirection cannot be predicted by the organization running the Web site.

BRIEF SUMMARY OF THE INVENTION

The present invention addresses the problem of preventing the falsification of server access logs, either by direct modification of log files or by issuing artificial requests with spoofed addresses. One of the components of the invention that will be disclosed is an authentication device, that can exchange information with the application server, and such that undetected opening or modification is impossible. This can be achieved with tamper-evident hardware, or by placing the device in a physically protected site.

The certification agency will have its own trusted server. It should not reside on the same Local Area Network (LAN) and premises as the server to be certified. It should be controlled and protected by the certification agency. Clients can be anywhere on the network and should have access to both the server to be certified and the server controlled by the certification agency.

When a client requests a document, it uses the relevant application protocol to send its request, including, e.g., the path of the file to be retrieved or any other kind of resource locator. Once this request arrives at the server, a corresponding log line is passed to the authentication device. This line contains everything that needs to be certified: for example the requested document, a time stamp, and the client address.

For each such log line, the authentication device appends a sequence number and an internally generated random bit B, and uses internal secret keys to compute a corresponding Message Authentication Code (MAC). MACs should be computed efficiently and must be impossible to forge without knowledge of the relevant keys. A digital signature could also be used, but is less efficient. After calculating the MAC, the authentication device sends it to the server along with the generated random bit B. The server stores the MAC, the bit B, and the log line on an accessible medium.

If B=0, the server handles the client request in a normal fashion, according to the application protocol specification. If B=1, the server redirects the client request to the server of the audit agency. The bit B should be generated in such a way that B=1 with low probability (e.g., 0.001 or less), so as to make the system as efficient as is necessary.

If B=1 and if the client request is authentic, the server of the audit agency receives a request from the redirected client. The request is logged for later comparisons and the client is redirected again to the original site. After a pre-defined audit period, the institution running the server sends its log files and the corresponding MACs to the certification agency for verification purposes. The certification agency will accept these log files if all the lines marked by the authentication device correspond to an associated client record at the agency's site. Moreover, every computed MAC for a certain line must be correct and sequence numbers assigned to lines must be consecutive. If this is not the case in a repeated number of occurrences, certification could be denied, based on the agency's policy. When certification is granted for a particular log file, derivative works such as statistics will be certified, as well.

It will be evident to those skilled in the art that the bit B must be unpredictable to anyone but the certification agency, otherwise log lines where B=0 could be inserted or modified without detection. Consequently, the device that generates this bit and the corresponding MACs must either be tamper-evident or physically protected. In a preferred embodiment, a tamper-evident device is directly connected to the server, for increased performance.

In summary, the present invention prevents undetected falsification of server access logs. It may be applied to any protocol supporting the "redirect" concept, including HTTP.

BRIEF DESCRIPTION OF THE DRAWINGS

The purpose of the drawings is to describe only typical embodiments of the invention, thus it may be possible to implement the method and the apparatus here disclosed in different ways.

DETAILED DESCRIPTION OF THE INVENTION

To fully understand the purpose of every component of the present invention, it is important to explain how falsification of server access logs might be carried out.

The first possible action that this invention aims to prevent is the direct modification of access log files. For practical and technological reasons, files that need to be modified (e.g. appending information, as it usually happens with log files) are stored on readable and writable devices, not on read-only devices. This fact allows any entity (it may be a person, or a computer program) with sufficient access rights and skills to change log files every time this is convenient. Useful alterations include adding entries to the log file (e.g. to show that an object has been requested a larger number of times), deleting entries (e.g. to hide the fact that an object can't be served because of a problem), individual alteration of entries (e.g. to maintain unchanged the number of entries while modifying the objects being requested or the identity of clients).

As a second case, requests to a server can be issued by clients that make use of spoofed addresses. This leads to an indirect alteration of access logs: files are not physically manipulated even though they contain improper requests originated from arbitrarily invented clients. As explained more fully below, the present invention addresses both falsification methods.

Figure 1A:
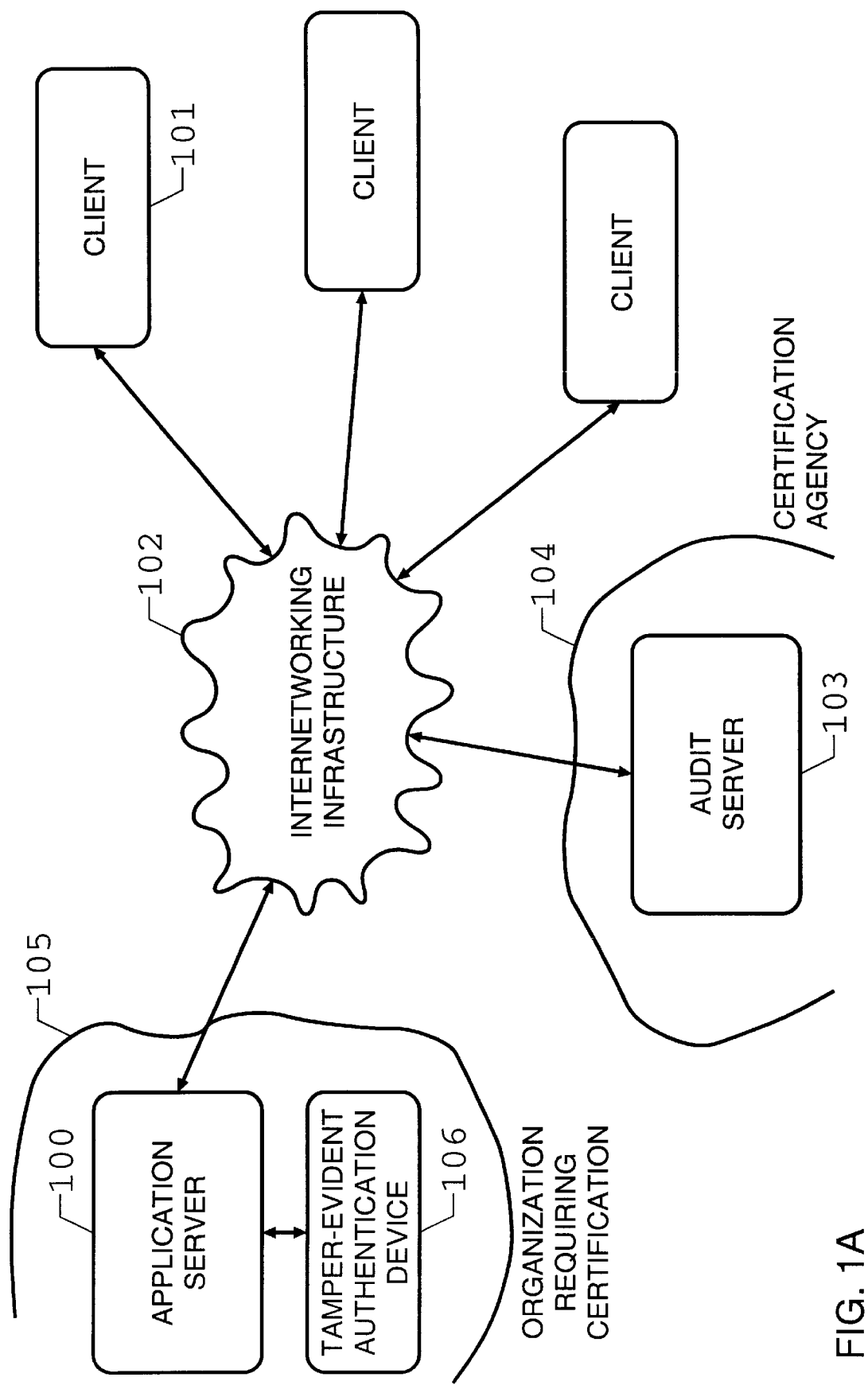
FIG. 1A is a diagram of a generic computer network and apparatus used in the present invention.
Figure 1B:
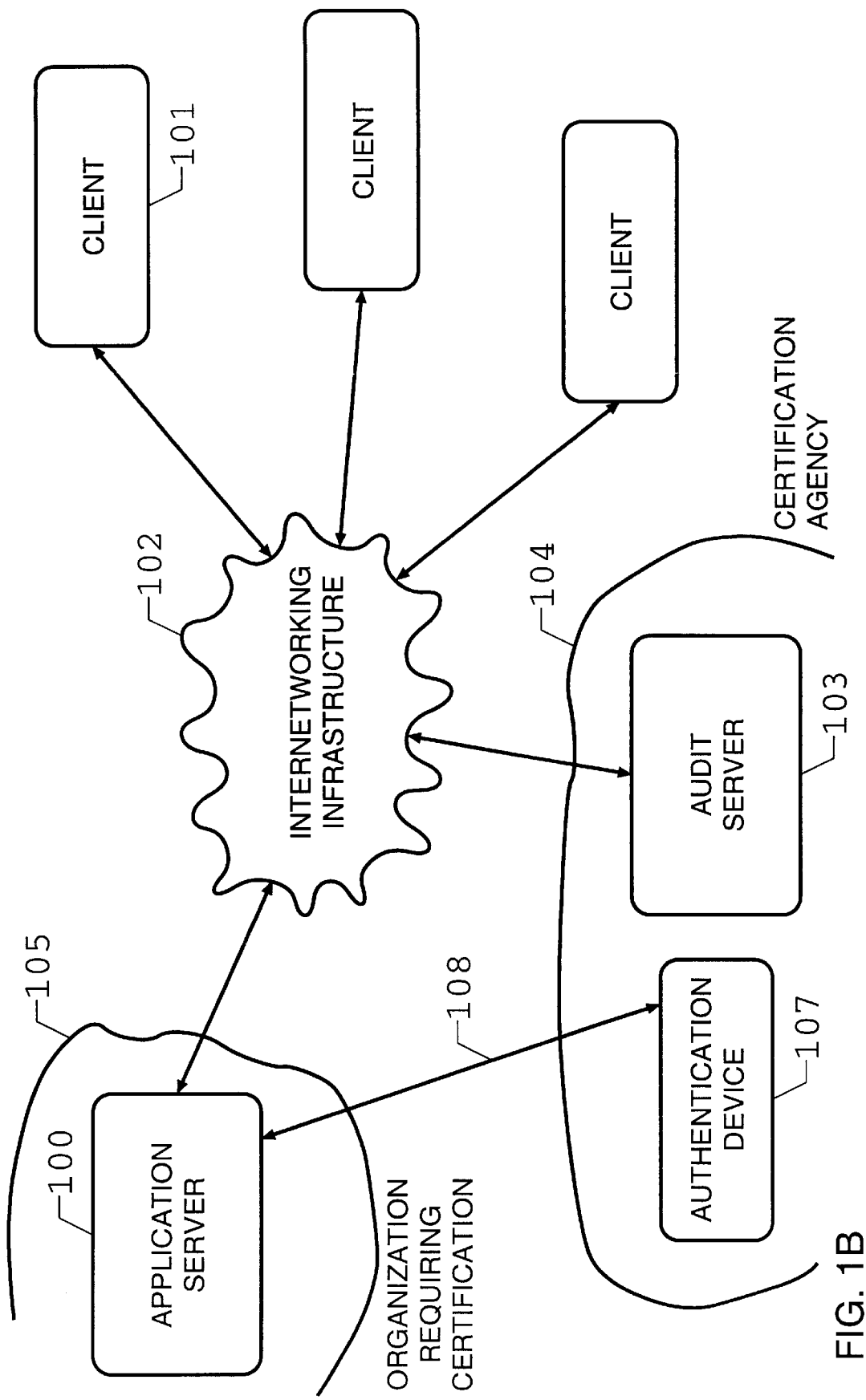
FIG. 1B shows an alternative embodiment of the present invention, with an alternative position of the authentication device.

FIG. 1A and FIG. 1B show two possible embodiments of the present invention. The application server 100 provides a service to clients (101 is just an example of such clients). Clients connect to the application server 100 through an internetworking infrastructure 102. In typical embodiments, this infrastructure is the Internet. Both the client and the application server must communicate using a protocol that supports the "redirect" concept (e.g. HTTP, as defined in IETF RFC 1945 and IETF RFC 2068). This means that the application server may reply to the client providing an alternative location to look up for the requested service instead of providing the service itself. In one embodiment of this invention, using the HTTP protocol, the application server can reply with a "Location:" header in its response to the client, instead of sending the requested document. This in in conformance with the HTTP protocol specification.

The certification agency owns an audit server 103 which resides in a local area network (LAN) 104 trusted by the agency itself. The audit server uses the same protocol employed by the application server 100 and the client 101. The service provider LAN 105 need not be trusted by the certification agency.

FIG. 1A and FIG. 1B differ in the placement and nature of the authentication device, which will be disclosed in more detail later. Such device must be tamper-evident if it is to be directly connected to the application server 100. This is the case of FIG. 1A, where the device is labeled with number 106 and resides in an untrusted environment. The property of tamper-evidence means that every attempt (successful or not successful) to open, inspect, modify or alter in other ways such device must be detectable by the certification agency. Direct connection may be established in many ways. Two of the preferred methods are using one of the application server's serial ports or parallel printer ports. However, there exist other connection methods (such as USB ports) that still don't change the principles of the present invention. The tamper-evident authentication device 106 could also communicate with the server over the local area network 105, or even over an untrusted wide area network, although this is not recommended for efficiency and security reasons.

In FIG. 1B, the authentication device 107 is placed in a trusted environment (the certification agency's LAN), so it need not be tamper-evident. The connection between the application server 100 and the authentication device 107 is obtained with a low-delay link 108. Such link may be an ISDN line, a direct point-to-point connection or any other communication medium that a skilled person in the art judges convenient from the point of view of efficiency.

Figure 2:
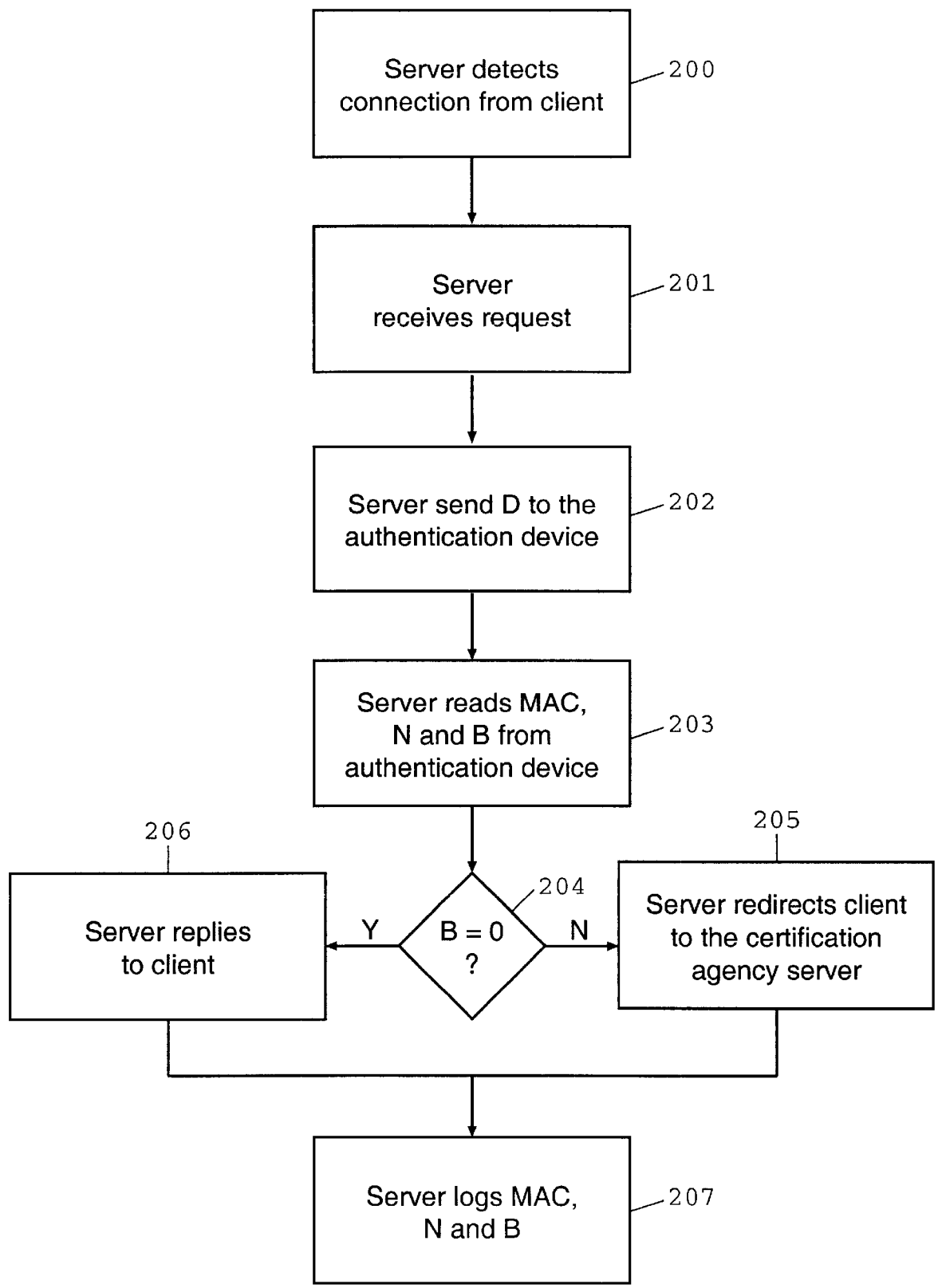
FIG. 2 is a flow chart showing the possible operation of the application server according to the present invention.

FIG. 2 describes the actions taken by the application server whenever a connection from a client is received (phase 200). After reading the request (phase 201), but before replying to the client (phase 205 or 206), the application server sends a block of data (referred to as L hereafter) to the authentication device (106 in FIG. 1A, or 107 in FIG. 1B). L must comprise relevant information that needs to be certified in the client's request. Every specific protocol (and, possibly, customer) has different certification needs, so this document will only suggest a possible alternative. It is to be understood that different methods for building L may be presented, without departing from the present invention.

In one embodiment of this invention, using the HTTP protocol, the application server is a Web server and receives requests from an HTTP client. L may be a text line constructed using the following fields from the request:
client address;
user identification, if provided by the client;
time stamp of the request;
path of the requested document, including the request method (e.g., GET, POST, etc.) if necessary.

When the authentication device receives L, it computes a sequence code or number N, that has to be unique for every audit period, a binary digit B and authentication information, such as a message authentication code (MAC). MACs should be computed efficiently and must be impossible to forge without knowledge of the relevant cryptographic keys. Such knowledge is impossible to gain for the application server organization without tampering with the authentication device. However, this circumstance would be detected by the certification agency (in the case of FIG. 1A) or is physically impossible (in the case of FIG. 1B). Any secure and efficient algorithm for computing MACs is acceptable, for example HMAC described in IETF RFC 2104 would serve the purpose. In another embodiment of the present invention, digital signatures could be used instead of MACs. This is a correct implementation, even though less efficient. In general, any authentication mechanism is acceptable if it guarantees that the string obtained by concatenating L, B and N cannot be altered at a later time without the possibility of detection by the audit agency. The exact purpose of the sequence code N and of the random bit B will be made clear later, when explaining how certification is granted or denied. The bit B could be represented by any random code C, where some possible values of C correspond to B=0, and the other possible values of C correspond to B=1.

The random bit B can be generated in many different ways. As a first example, in a preferred embodiment, the authentication device could use an internal cryptographic random bit generator, using secret keys shared with the audit agency. These keys could be the same as, derived from, or related to the keys used by the authentication device to generate the MACs. In this case, the bit B need not be authenticated with the MAC nor is it necessary to log its value, together with a corresponding line of log L. The audit agency, in fact, will be able to obtain its value using the same random bit generation procedure, based on the above mentioned secret keys. The audited organization, on the other hand, will be unable to predict B, since it will not have access to said keys. As a second example, in an alternative embodiment, the bit B could be generated by a random physical process internal to the authentication device, and unpredictable by external observers. For instance, the authentication device could measure internal physical quantities, e.g. temperature or voltage, and derive a physically random bit. In this case, it is necessary that the process be unpredictatble, unless the device is opened. In this case, it will be necessary to append B to the log information L, authenticate it with a corresponding MAC, and store it for later checks by the audit agency.

Referring again to FIG. 2, phase 203 indicates that the application server reads MAC, B and N from the authentication device. The MAC is an authentication of L, N and, possibly, B, produced by the device. If B=0 (phase 204), the request is processed in a normal fashion according to the client-server protocol in use (phase 206). If, on the other hand, B=1, the application server redirects the client to the audit agency server (phase 205) and the request is considered as serviced. In one embodiment of the present invention, using the HTTP protocol, the redirect response can be issued from the server by sending a "Location:" header to the client. After serving the request, in the logging phase (207), the application server stores the log line L, N, MAC, and, possibly, B, on accessible storage means for later verification. If the log line L is only part of a more informative server log, it is possible to either store L or use an algorithm at certification time to obtain L from the server log line that is stored on disk.

It is not necessary to explain the client behavior in further detail because the client software and hardware need no modifications, as long as they are fully protocol compliant and act correctly when a "redirect" response is received.

Figure 3A:
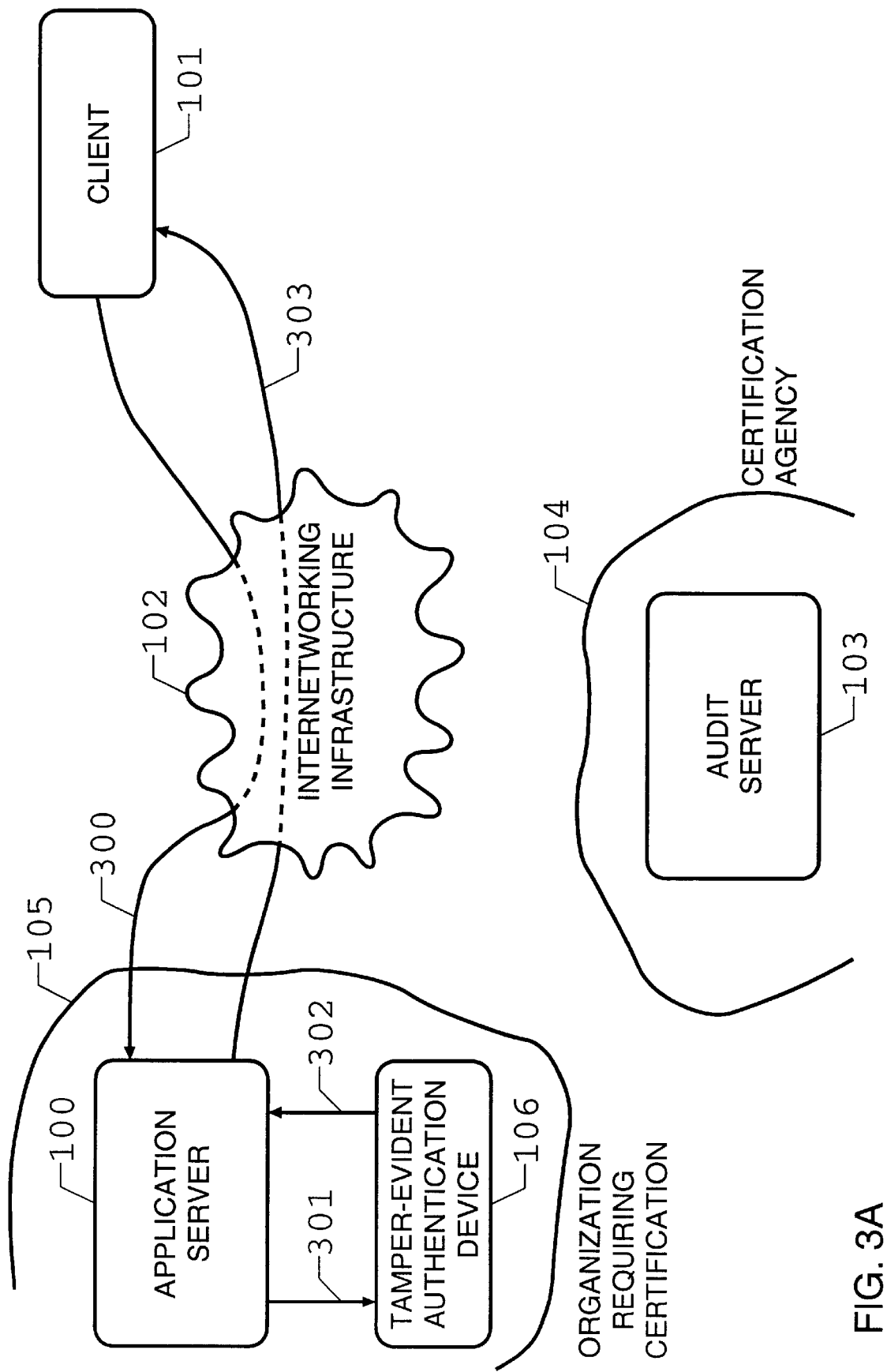
FIG. 3A shows the flow of information between the client and the server when B=0.

The audit server (label 103 in FIG. 1A and FIG. 1B) is not involved when B=0 for a request on the application server side. This is visible in FIG. 3A, which summarizes the data transfers when B=0. Referring to FIG. 3A and FIG. 2, phase 300 in FIG. 3A corresponds to phases 200 and 201 in FIG. 2, phase 301 corresponds to phase 202, phase 302 corresponds to phases 203 and 204 (with B=0), and phase 303 corresponds to phase 206.

Figure 3B:
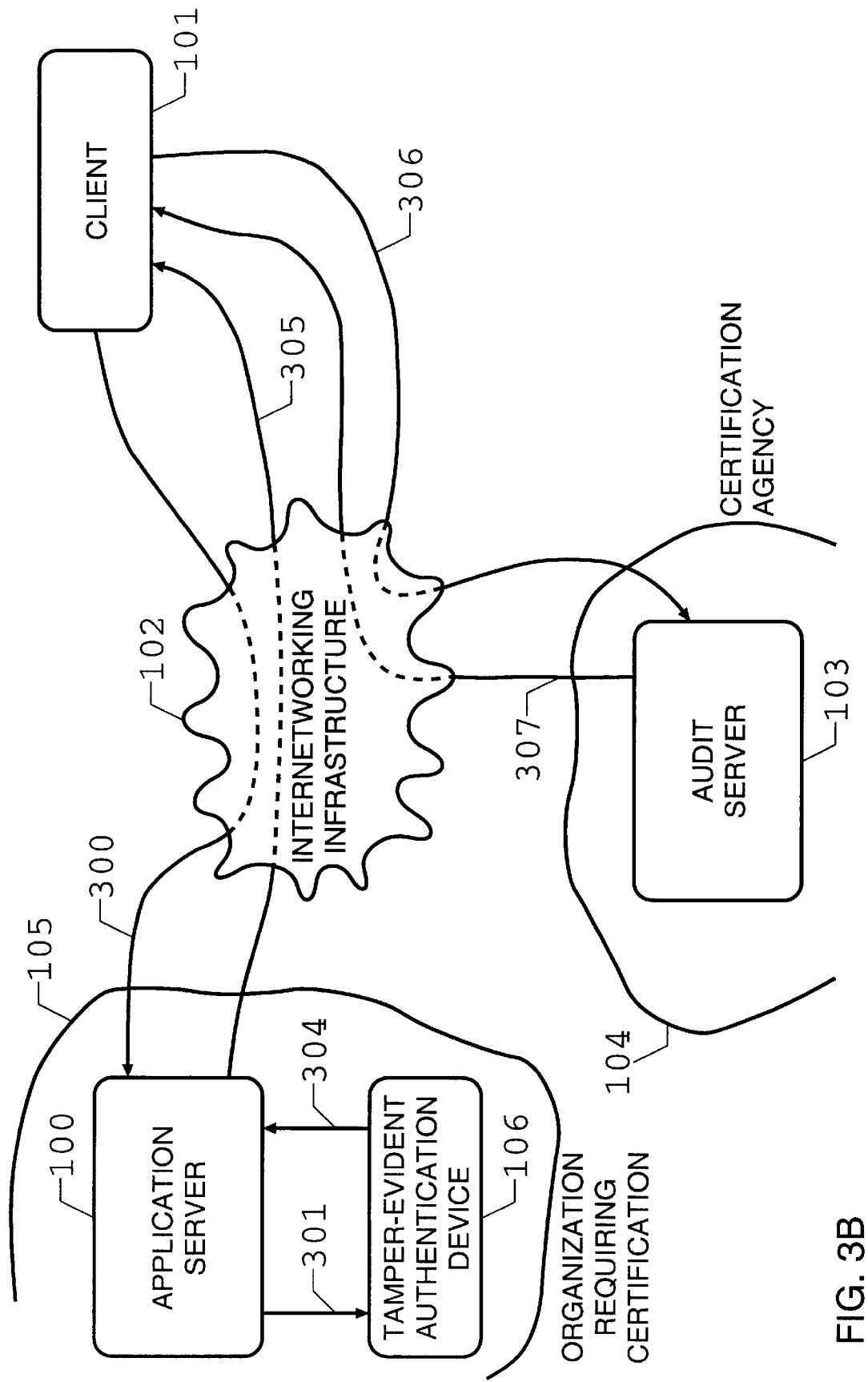
FIG. 3B shows the flow of information between the client, the server and the certification agency's server when B=1.

When B=1, the client connects to the audit server because it receives a redirect request from the application server (phase 205 in FIG. 2). As is shown in FIG. 3B, the audit server 103 redirects the client 101 again to the application server 100. Moreover, the audit server logs the request for later comparison with the application server log files. As as result, after this second redirection, the client connects again to the application server first contacted and issues its request again. Referring now to FIG. 3B and FIG. 2, phase 300 of FIG. 3B corresponds to phases 200 and 201 of FIG. 2, phase 301 corresponds to phase 202, phase 304 corresponds to phases 203 and 204 (with B=1), and phase 305 corresponds to phase 205. Phases 306 and 307 will be transparent for the user as long as the client is protocol compliant.

For efficiency reasons, B should be generated in a way such that B=1 with low probability. A probability of 0.001 or less is acceptable, even though the present invention works correctly with higher probabilities. With higher probabilities of B=1, the system is more reliable, with lower probabilities, server access is more efficient. For example, suppose a server receives an average of 10,000 hits per day—this is a reasonable lower bound for servers that provide advertisement for a fee. If the probability of B=1 is set to 0.0001, the server will have to redirect a client request about once a day, which is more than acceptable from the point of view of efficiency. Thus, if the Web site organization falsifies one log entry, the probability that this is not detected is 9,999/10,000. As successive generations of the random bit B are independent, the probability of falsifying N entries without detection is $(9,999/10,000)^N$. Log falsification has to be worth the risk, so suppose that the Web site organization artificially modifies at least 10% of the log file. In our example, this amounts to 1,000 bogus entries per day. After an audit period of, e.g., one month, we have 30,000 such entries, and the probability of detecting the falsification of at least one entry is equal to $1-(9,999/10,000)^{30,000}$, which is higher than 95%. This probability can be made as high as desired by making B=1 more frequent or by having longer audit periods.

When the client 101 connects again to the application server 100, the latter processes the new requests and behaves as described above and depicted in FIG. 2, FIG. 3A and FIG. 3B. Thus, it is possible that the request is redirected again instead of being served. This, however, happens with a very small probability, 0.01% or less if the probability of the first redirect is 1% or less. There is the theoretical possibility of a client being trapped in an infinite loop of request—redirect—request—redirect operations. This is not to be considered dangerous because, with every request, the probability of this event becomes 100 times smaller, in the case of an initial 1% probability of B=1. So, if the first request may be redirected with a 1% probability, the second redirect may be issued by the application server with 0.01% probability, the third with 0.0001% probability and so on.

There exist protocol-specific and protocol-neutral mechanisms to avoid such "looped" requests. In general, for many protocols, it would be possible to slightly alter the name of the requested object returned to the client in phase 307 of FIG. 3B. Repeating the client-server communication phase 300 (FIG. 3A), the client would request the original object with a small addition to the object's name. The application server, detecting this conventional string appended at the end of the object's name, could skip phases 301 and 302, strip the string and serve the object without involving audit redirections. In one embodiment of the present invention, using the HTTP protocol, the audit server could append for example the string "..AUDIT.." to the URL U that the client receives in phase 307 of FIG. 3B. Repeating phase 300 (FIG. 3A) because of the redirect received by the audit server, the client would not ask U alone, but U with the string "..AUDIT.." appended. The HTTP server would recognize this situation and process the request in a normal fashion, as if "..AUDIT.." was not present. However, in typical embodiments of the present invention, where the redirect probability is less than 0.001, the tiny probability of multiple redirections for the same request does not usually justify special measures in order to prevent it.

During the functioning of the present invention, some cases that require special mention may arise. Some client-server communication systems, such as the ones based on the HTTP protocol, allow the client to connect to a proxy server instead of the server selected by the user. A proxy server acts as an intermediary between the client and the final server. When a client requests an object to the proxy, the latter checks if the object is already present in its cache memory. If this is true, the object is immediately sent to the client, without connecting to the final server. When the requested object is not present in the proxy's cache memory, the proxy connects to the final server, retrieves the object, stores it in its cache memory for future requests and sends it to the client. Proxies usually speed up client requests, but they are also a problem when precise counting and statistics are needed. Pitkow, in "In Search of Reliable Usage Data on the WWW", addresses this problem from the statistical point of view. The present invention may be affected by proxies in some ways.

Firstly, object requests that are handled by the proxy without connecting to the real application server cannot be certified, because the application server is not involved in the communication and doesn't have the chance to issue a redirect response. Such requests do not even appear in the server log files, and can only be approximated when producing access statistics.

Secondly, when there are proxies between the client and the server, the present invention allows to verify the authenticity of the proxy server request to the application server, not the client request. However, considering the HTTP protocol, which is one of the primary applications of the present invention, most proxy servers send a "Via:" or "X-Forwarded-For:" header to the HTTP server when making a request on behalf of a client. This may be used in some embodiments of the present invention when stricter checks on the existance of the client are needed, for example by sending "ICMP Echo Request" packets to the client and waiting for "ICMP Echo Reply" messages.

Thirdly, there is, for example in HTTP environments, a special case that may deserve attention. If a fake client is installed in the application server LAN (105 in FIG. 1A), the following actions are possible:

the fake client uses the address of a known public proxy and connects to the application server;
if the application server does not redirect the request, the fake connection goes undetected;
if the application server redirects the request, the fake client, using its true address, connects to the proxy asking to fetch the relevant object from the audit server;
the audit server responds to the public proxy by sending a redirect, the proxy replies to the fake client, which is using a legitimate address and can be reached from the outside;
the audit server logs this request from the public proxy;
the fake client uses again the public proxy address and connects to the application server.

These operations are likely to generate a correct flow of information between the client, the application server and the audit server, making this kind of forged requests undetectable.

However, it's not trivial for a fake client to behave in this way. Moreover, public proxies that can be used in this context of operation are very hard to find and most of them are well known. As a consequence, it would be possible for an embodiment of the present invention to deny certification for requests from these kinds of proxies. Furthermore, in HTTP environments, careful inspection of headers like "Via:" or "X-Forwarded-For:" would most certainly reveal abnormal situations, such as a client from the application server organization using an external proxy to access an internal server.

It is now possible to fully understand how the certification process works. Both the application server institution and the audit agency have to agree on scheduled certification periods (audit periods). When a predefined audit period expires, the application server institution sends log files and the corresponding values of MAC, B (if required), and N to the certification agency. The certification agency checks each log entry, or a sample of these log entries for greater efficiency. For each entry to be considered authentic, the corresponding MAC should be correct and N should be consistent with the previous value (e.g., it should be exactly the previous value of N plus one). Moreover, each entry marked with B=1 should have a corresponding entry in the audit server log files.

It is acceptable that a number of entries in the application server logs fail to pass these tests. In fact, if a client is terminated between a request to the application server and a corresponding redirect (when B=1), a log entry at the audit agency will be missing. The same will occur if the network becomes unavailable during the same time interval. These will normally be, however, rare events. The certification agency, considering its policies, will certify the log files if the number of failed verifications does not exceed a predefined amount, otherwise certification will be denied. Access statistics produced from certified logs in a trusted environment will inherit this property and will be certified.

It will be evident to those skilled in the art that the present invention avoids direct and indirect (using fake clients with spoofed addresses) log file falsification. Direct modifications of log entries are not possible: changing entries would mean calculating corresponding MACs, which is impossible without obtaining the relevant cryptographic keys, which in turn is impossible without tampering with the authentication device (if available at all, since this is not required in every embodiment of the invention). Every attempt to tamper with the authentication device would be detected by the certification agency at periodic integrity checks, and certification would be denied in these cases. It is also impossible to add, duplicate or delete entries, because the sequence numbers would no longer be consistent. In the first case a new MAC should be calculated, too. In all cases, new sequence numbers could be associated to each log entry, but this would imply calculating new MACs, because they are based upon sequence numbers, also.

Finally, artificial requests are detected because fake clients with spoofed addresses cannot communicate properly with the audit server, which resides in a trusted network where fake requests should eventually arrive. However, responses would definitely not be able to return to the originating source, which must be placed in a network controlled by the same organization that controls the application server. Such fake requests, if they are able to arrive to the audit server, would not receive a successful response and would generate an error condition in the audit server logs, thus allowing the certification agency to detect address spoofing. For connection-oriented transport protocols, in particular, it would be impossible to establish a connection with the audit server from a client with a spoofed address, and this would be detected by the audit agency. This would happen in an application of the invention to the HTTP protocol, using the connection oriented TCP protocol as a transport.

It is to be understood that, although the present invention has been described with references to preferred embodiments, various modifications, known to those skilled in the art, may be made to the methods and apparatus presented herein without substantially changing the present invention. For example, it may be possible to authenticate many log entries with just one authentication code, and such code may be provided just once, at the end of a given audit period. In a significantly more costly embodiment, authentication may be achieved by physically storing the log data in a protected environment or with tamper-evident hardware. However, the invention limitations are described solely as set forth and defined in the following claims.

What is claimed is:

1. An apparatus for the verification of server access logs, comprising:
   an audit server, controlled by a certification agency, comprising means for receiving client requests, redirecting them to an application server needing access log verification, and storing corresponding log information;

the application server, controlled by an organization requiring log certification, comprising means for receiving and servicing client requests, for storing corresponding log information, and for redirecting a subset of said client requests to said audit server;

a message authentication device, that cannot be modified or inspected without detection by said certification agency, comprising means for receiving a log entry from said application server and generating a corresponding random code C, wherein said code C is generated cryptographically by said authentication device using secret keys that are stored internally to said authentication device, and are available only to said certification agency.

2. The apparatus of claim 1, wherein said authentication device further comprises means for storing log information internally.

3. The apparatus of claim 2, wherein said authentication device is located where it can be accessed by the organization to be certified or by third parties, and is constructed so as to be tamper-evident.

4. The apparatus of claim 2, wherein said authentication device is located where it can only be accessed by said certification agency.

5. The apparatus of claim 1, wherein said authentication device further comprises means for generating authentication information.

6. The apparatus of claim 5, wherein said authentication information comprises Message Authentication Codes, computed using secret keys that are stored internally to said authentication device, and are available only to said certification agency.

7. The apparatus of claim 5, wherein said authentication information comprises digital signatures, computed with private keys that are stored internally to said authentication device, and may be available only to said certification agency.

8. The apparatus of claim 5, wherein said random code C is produced by a physical process internal to said authentication device, and is authenticated by said authentication device.

9. The apparatus of claim 5, wherein said authentication device is located where it can be accessed by the organization to be certified or by third parties, and is constructed so as to be tamper-evident.

10. The apparatus of claim 5, wherein said authentication device is located where it can only be accessed by said certification agency.

11. The apparatus of claim 5, wherein said authentication device further comprises means for generating a sequence code, associated and authenticated with every said log entry.

12. A method for the auditable logging of client requests to an application server, comprising the following steps:

passing a log entry, computed based on said client request, to a message authentication device;

obtaining from said authentication device a random code C, wherein said code C is generated cryptographically by said authentication device using secret keys that are stored internally to said authentication device;

storing said log entry, together with said random code C;

servicing the client request as required by the application protocol if said code C belongs to a first set of possible values;

redirecting the request to an audit server if said code C belongs to a second and disjoint set of possible values.

13. The method of claim 12, wherein said application server is an HTTP server.

14. The method of claim 12, wherein said application server is a protocol server at the application level, and where redirection i s possible.

15. The method of claim 12, further comprising the step of obtaining message authentication information from said authentication device, and storing it on accessible storage means.

16. The method of claim 15, wherein said authentication information is computed with respect to log entries, comprising a sequence code and a corresponding said random code C.

17. The method of claim 15, wherein said authentication information is computed with respect to log entries, comprising a sequence code, and where the corresponding said code C can be determined by an audit agency, by means of secret keys shared with said authentication device.

18. The method of claim 15, wherein said authentication information comprises a Message Authentication Code.

19. The method of claim 15, wherein said authentication information comprises a digital signature.

20. A method for auditing, verifying, and certifying the access log files of an application server, comprising the following steps:

installing and running an audit server, that logs client requests;

verifying that each entry of said application server log files has an associated sequence code and that such sequence codes occur in said log files in a preset order and without omissions;

verifying the integrity and the authenticity of said application server log files;

verifying that selected log entries included in said application server log files correspond to a log record on said audit server, wherein said log entries are selected based on the value of a random code C, wherein said code C is generated cryptographically by an authentication device using secret keys that are stored internally to said authentication device;

producing a certification of said log files, based on the outcome of the previous steps, and on a previously agreed certification policy.

21. The method of claim 20, wherein each entry of said application server log files further comprises a random code C, and wherein said selected log entries correspond to a subset of the possible values of said code C.

22. The method of claim 20, wherein said selected entries are chosen based on a cryptographic random code generation.

23. The method of claim 20, wherein said audit server further comprises the function of redirecting client requests to the application server that originally received said client requests.

24. The method of claim 20, further comprising the step of periodically verifying the integrity of tamper-evident authentication devices used by said application server.

* * * * *